(12) United States Patent
Keishiro et al.

(10) Patent No.: US 12,192,618 B2
(45) Date of Patent: Jan. 7, 2025

(54) AUTOMATIC PHOTOGRAPHY COMPOSITION RECOMMENDATION

(71) Applicant: HUAWEI TECHNOLOGIES CO., LTD., GuangDong (CN)

(72) Inventors: Uragaki Keishiro, Tokyo (JP); Sato Hiroyuki, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 18/171,014

(22) Filed: Feb. 17, 2023

(65) Prior Publication Data
US 2023/0209182 A1 Jun. 29, 2023

Related U.S. Application Data

(63) Continuation of application No. PCT/CN2020/110490, filed on Aug. 21, 2020.

(51) Int. Cl.
| | |
|---|---|
| *H04N 23/60* | (2023.01) |
| *G06F 3/16* | (2006.01) |
| *G06T 7/00* | (2017.01) |
| *G06T 17/20* | (2006.01) |
| *H04N 23/67* | (2023.01) |
| *H04N 1/00* | (2006.01) |

(52) U.S. Cl.
CPC ............ *H04N 23/64* (2023.01); *G06F 3/167* (2013.01); *G06T 7/0002* (2013.01); *G06T 17/20* (2013.01); *H04N 23/67* (2023.01); *G06T 2207/10024* (2013.01); *G06T 2207/10028* (2013.01); *G06T 2207/30168* (2013.01); *H04N 1/00183* (2013.01)

(58) Field of Classification Search
CPC ...... H04N 23/61; H04N 23/611; H04N 23/64; H04N 1/00183
USPC ..................................................... 348/333.01
See application file for complete search history.

(56) References Cited

U.S. PATENT DOCUMENTS

| | | | | |
|---|---|---|---|---|
| 2013/0272611 | A1* | 10/2013 | Nakamura | H04N 23/64 |
| | | | | 382/175 |
| 2015/0116350 | A1* | 4/2015 | Lin | G06N 7/01 |
| | | | | 345/620 |
| 2019/0253614 | A1* | 8/2019 | Oleson | H04N 23/62 |
| 2020/0145588 | A1* | 5/2020 | Kasuya | G06T 7/70 |
| 2020/0364914 | A1* | 11/2020 | Mech | G06T 7/33 |
| 2022/0321798 | A1* | 10/2022 | Li | H04N 23/64 |
| 2022/0329770 | A1* | 10/2022 | Sugano | H04N 13/111 |

* cited by examiner

*Primary Examiner* — Anthony J Daniels
(74) *Attorney, Agent, or Firm* — Rimon PC

(57) ABSTRACT

A device and method for taking pictures is disclosed. The device includes: a camera; a display; and a processor configured to capture a plurality of temporary images of one or more subjects by using the camera; extract a reconstructed scene from the plurality of temporary images; capture a focused image that a user intends to take a picture by using the camera; generate a subject map in the focused image by using the reconstructed scene; estimate an armature from the subjects selected from the subject map; combine the armature with the focused image; verify whether the composition of the focused image is good or not; and present an instruction to the user to adjust the composition by using the display. The device and method achieves improved photographic composition.

7 Claims, 11 Drawing Sheets

AUTOMATIC PHOTOGRAPHY COMPOSITION RECOMMENDATION

CROSS-REFERENCE TO RELATED APPLICATIONS

This application is a continuation of International Application No. PCT/CN2020/110490, filed on Aug. 21, 2020, the disclosure of which is hereby incorporated by reference in its entirety.

TECHNICAL FIELD

The present invention relates to a device and a method for taking pictures.

BACKGROUND

Photography is widely accepted as a hobby and a profession. However, taking pictures with good composition can be difficult for non-professionals. Professional photographers often use armatures, which are a set of lines and crossing points (for example, two vertical lines, two horizontal lines, and four crossing points of these lines), as a guide for composition (in other words, layout of a photo). However, it is not easy for non-professionals to select a proper armature, and apply it to a current target of which they are taking pictures to improve photography composition.

The prior art can be classified into two categories. One of the categories relates to quality evaluation of photography. Such prior art applies aesthetic quality evaluation techniques to photos taken by users. The information of evaluation may be used to give feedback to users in order to take photos with improved aesthetic quality. However, these prior arts are not focused on quality of composition.

Another category relates to recommendation of photography composition. There are three types of such prior art. The first type gives text suggestions to improve photography composition. However, how to translate the text suggestion into photography composition is sometimes not clear for users. The second type describes an adaptive armature identification based on image analysis. This type of prior art automatically identifies a proper armature with respect to photo preview: However, this prior art sometimes fails if the scene is complex, because it does not consider three dimensional scene representation. The third type analyses a portrait preview and shows an arrow guidance to improve portrait composition. The arrow guidance is similar to applying an armature. Using the arrow guidance, users are able to improve the quality of portrait composition without understanding the armature. However, this type of prior art is only able to deal with simple armatures and compositions, which limits further improvement of quality of composition.

SUMMARY

A device for taking pictures is provided for automatically recommending good composition when a user takes a photograph, and for providing correction of composition according to the user's permission.

According to a first aspect, a device for taking pictures is provided, wherein the device includes: a camera: a display; and a processor configured to capture a plurality of temporary images of one or more subjects by using the camera: extract a reconstructed scene from the plurality of temporary images: capture a focused image that the user intends to take a picture of by using the camera: generate a subject map in the focused image by using the reconstructed scene: estimate an armature from the subjects selected from the subject map: combine the armature with the focused image: verify whether the composition of the focused image is good or not; and present an instruction to the user to adjust the composition by using the display.

In a possible implementation of the first aspect, the device further includes a speaker, wherein the processor is further configured to present an audible instruction to the user to adjust the composition by using the speaker.

In a possible implementation of the first aspect, the processor is further configured to automatically adjust the composition if the user accepts the automatic adjustment.

In a possible implementation of the first aspect, the temporary images are pairs of color images and depth images.

In a possible implementation of the first aspect, the reconstructed scene includes polygonal meshes or point clouds.

According to a second aspect, a method for taking pictures is provided, where the method includes: capturing a plurality of temporary images of one or more subjects by using a camera: extracting a reconstructed scene from the plurality of temporary images: capturing a focused image that the user intends to take a picture by using the camera: generating a subject map in the focused image by using the reconstructed scene: estimating an armature from the subjects selected from the subject map: combining the armature with the focused image: verifying whether the composition of the focused image is good or not; and presenting an instruction to the user to adjust the composition by using a display.

According to a third aspect, a storage media storing a program thereon is provided, wherein when the program is executed by a processor, the program causes the processor to perform the method according to the second aspect.

The embodiments of the present invention achieve an improved photography composition.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are only some, but not all, of the embodiments of the present invention. All other embodiments obtained by a person of ordinary skill in the art based on the embodiments of the present invention without creative efforts shall fall within the protected scope of the present invention.

An example of a series of processes according to the embodiment of the present invention is as follows: A user activates a camera function of a mobile system while maintaining the camera of the system facing toward surroundings of a subject. The system automatically captures one or more images, which may be color or depth formats, and stores them in temporary caches which will be deleted after capturing. Using these temporary images, the system builds scene information which may include color images, depth images, normal maps, meshes or shapes represented with implicit functions. Candidates of the target subjects on a current focused image are estimated from the scene information, and photography composition is suggested with an armature which is a set of finite two-dimensional lines. The user can specify target subjects with a GUI (Graphical User Interface) on the screen of the system. The system combines the focused image and the armature, and verifies whether the current composition is good or not by evaluating the Euclidean distances between subjects on the screen and specified two-dimensional points which may be on lines or intersections of the armature. After the verification, the system shows the combined image and instructions for taking a photo with the best composition. The system can fit the current composition of the current focused image to the best composition with the user's permission. The details of these processes are described below.

Figure 1:
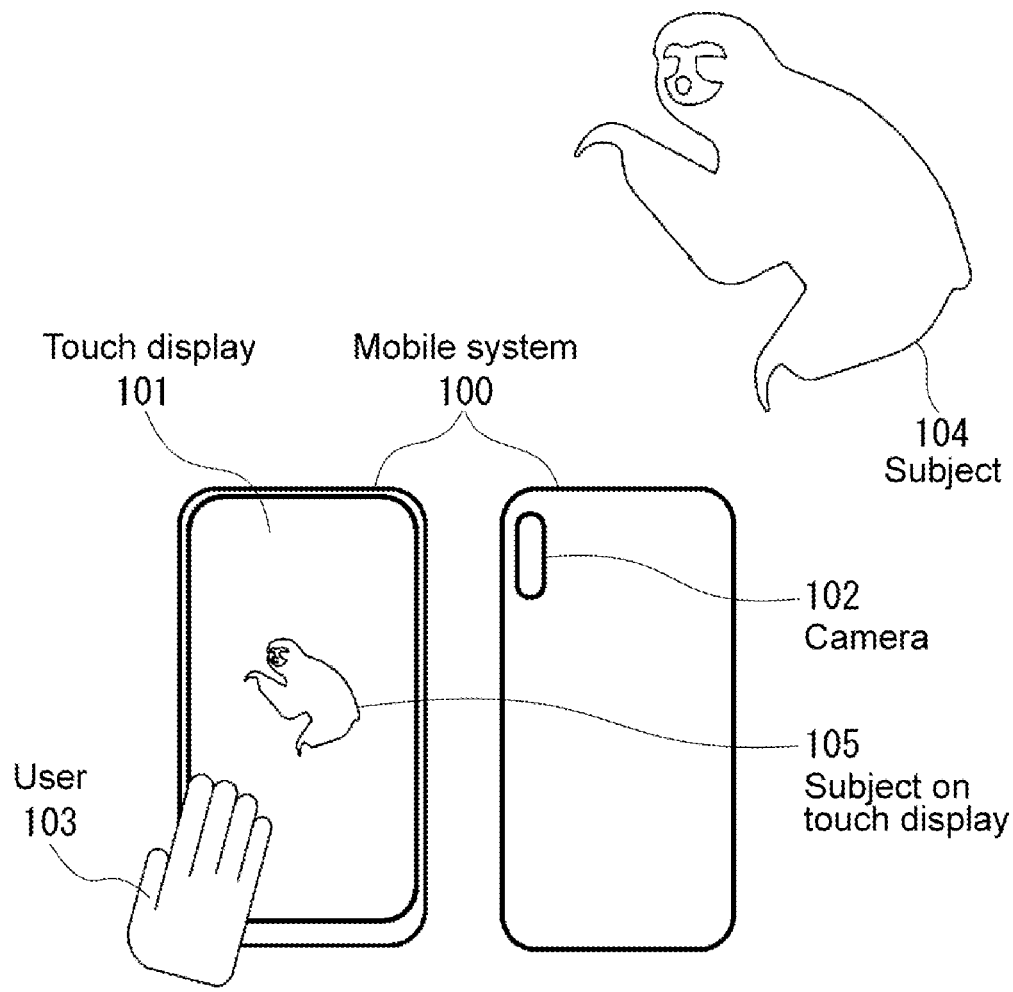
FIG. 1 shows an example of user operations according to the first embodiment.

The first embodiment of the present invention is implemented in a camera application to recommend and adjust photography composition automatically on a mobile system. The mobile system may be a mobile device having a camera and a display. FIG. 1 illustrates an example of user operations according to the first embodiment. First, a user 103 touches a touch display 101 on the system 100 to start the main process described in the flowchart of FIG. 4. During the main process, the user 103 is supposed to maintain the camera 102 facing toward surroundings of one or more subjects 104. For example, the user moves the camera 102 around the subjects 104 or the user moves with the camera 102 so that the camera 102 faces the subjects 104 from different directions.

Then, the subjects 104 are rendered on the touch display 101, and the user 103 can see the rendered subjects 105 and operate a GUI (Graphical User Interface) on the touch display 101 to take a picture if needed. In an embodiment, a subject map to specify target subjects is displayed on a focused image of which the user 103 intends to take a picture. Based on the specified target subjects, an armature and an instruction to the user 103 are display on the focused image, and the focused image is manually or automatically adjusted.

Figure 2:
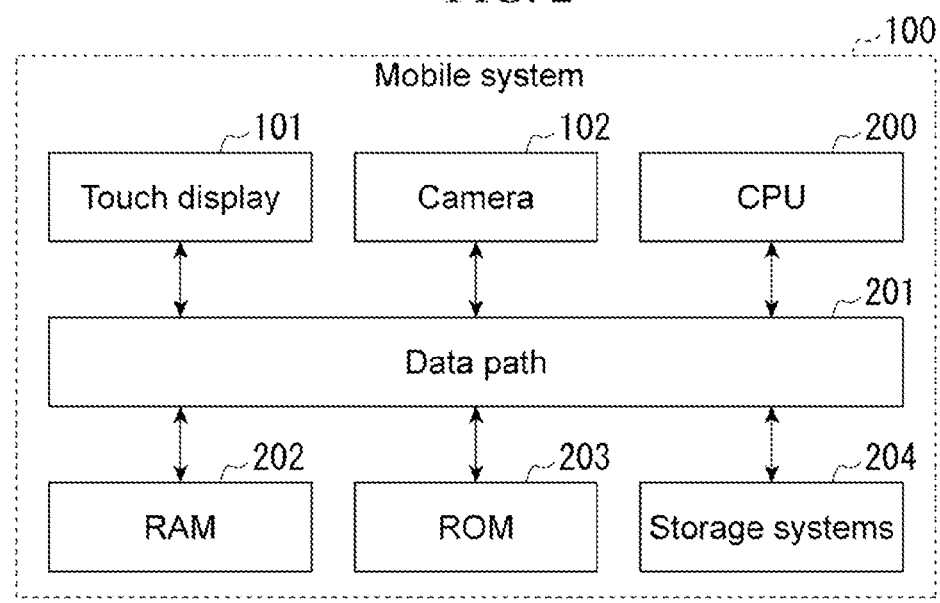
FIG. 2 shows a block diagram of a hardware configuration of the mobile system 100 according to the first embodiment.

FIG. 2 depicts a block diagram of a hardware configuration of the mobile system 100 according to the first embodiment. The mobile system 100 includes a touch display 101, a camera 102, a CPU (Central Processing Unit) 200, a data path 201, a RAM (Random Access Memory) 202, a ROM (Read Only Memory) 203 and storage systems 204.

The touch display 101 receives touch operations by the user 103, and shows a GUI and pictures which are captured with the camera 102 or stored in the storage systems 204. The camera 102 may include CMOS image sensors, depth sensors, or additional sensors, and capture images or videos, whose formats are color images or depth images. The types of depth sensors may be ToF (Time of Flight) sensors, Structured-light 3D scanner or other known sensors. The depth image is an image in which depth values are visualized, and the depth value is defined as a distance from a subject.

The CPU 200 controls each component connected through the data path 201. The data path 201 includes an input/output interface or a bus to convey data to each component. The RAM 202 is used as a main memory of the CPU 200. The ROM 203 stores an OS (Operating System), programs, system drivers and so on. The storage systems 204 store most data of the mobile system 100 and may be SSD (Solid-State Drive), HDD (Hard Disk Drive) or other disk drives. The camera application for recommending and adjusting photography composition may be stored in the storage systems 204.

Figure 3:
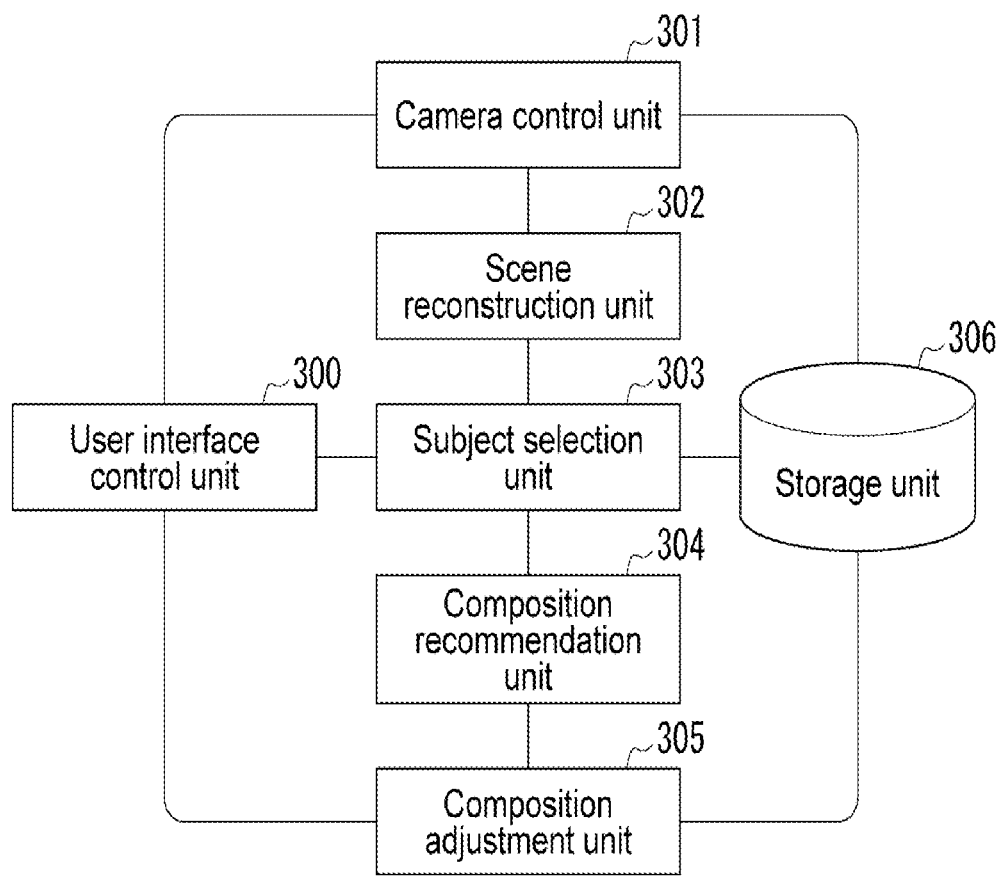
FIG. 3 shows a block diagram of a functional configuration of the mobile system 100 according to the first embodiment.

FIG. 3 shows a block diagram of a functional configuration of the mobile system 100 according to the first embodiment. When the camera application for recommending and adjusting photography composition is executed using the hardware in FIG. 2, this functional configuration is realized. The mobile system 100 includes a user interface control unit 300, a camera control unit 301, a scene reconstruction unit 302, a subject selection unit 303, a composition recommendation unit 304, a composition adjustment unit 305 and a storage unit 306.

The user interface control unit 300 receives user inputs or operations on the touch display 101 such as a touch, a swipe and so on. The user interface control unit 300 displays a GUI on the touch display 101 according to the user inputs and the other states of the mobile system 100.

The camera control unit 301 controls the camera 102 in the mobile system 100. The camera control unit 301 captures one or more images and stores the images in the storage unit 306. The images may be a set of static separate images or time-sequential images. Multiple formats of the images such as color and depth may be used. The camera control unit 301 also controls functions of the camera 102 such as zooming, angle adjustment, focus correction, and other affine transformations to change the view of the images.

The scene reconstruction unit 302 reconstructs three-dimensional (3D) scene information (a reconstructed scene) from the images captured by the camera control unit 301. The scene information may be a set of color images, depth images or 3D geometry represented as a set of polygonal meshes, point clouds or implicit functions.

The subject selection unit 303 generates a subject map to specify target subjects in a focused image based on the captured images and the 3D scene information. The phrase "focused image" refers to an image that the user 103 intends to take a picture, namely, an image to which the camera 102 is directed when the camera control unit 301 detects a user operation related to taking a picture, for example, when the camera 102 is directed in a certain direction for a predefined duration, when the user performs a half-push operation on a shutter button, and so on.

The composition recommendation unit 304 generates armatures and instructions as a recommendation for the focused image.

When the user accepts automatic composition adjustment, the composition adjustment unit 305 generates a control signal to adjust the camera 102 according to the armatures and the instructions, and sends the control signal to the camera control unit 301.

The storage unit 306 reads and writes the images, predefined armatures, models and parameters used in the other units.

Figure 4:
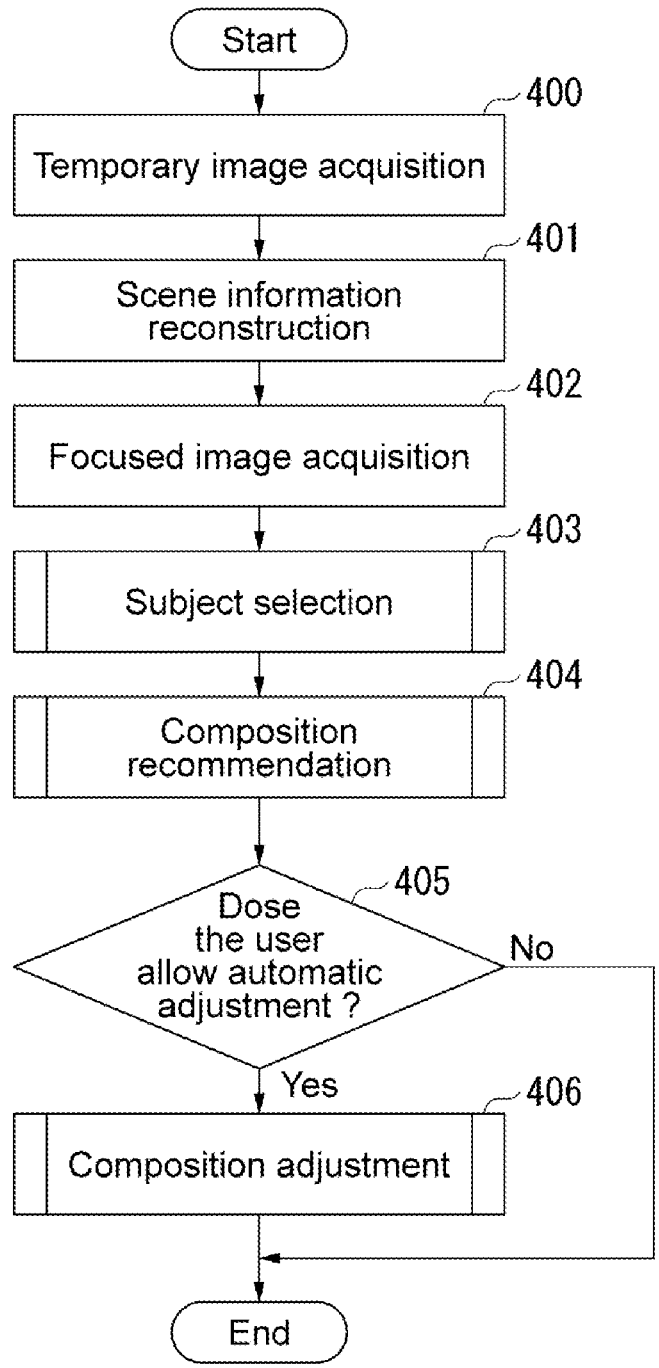
FIG. 4 shows an overall flowchart of the first embodiment.
Figure 5:
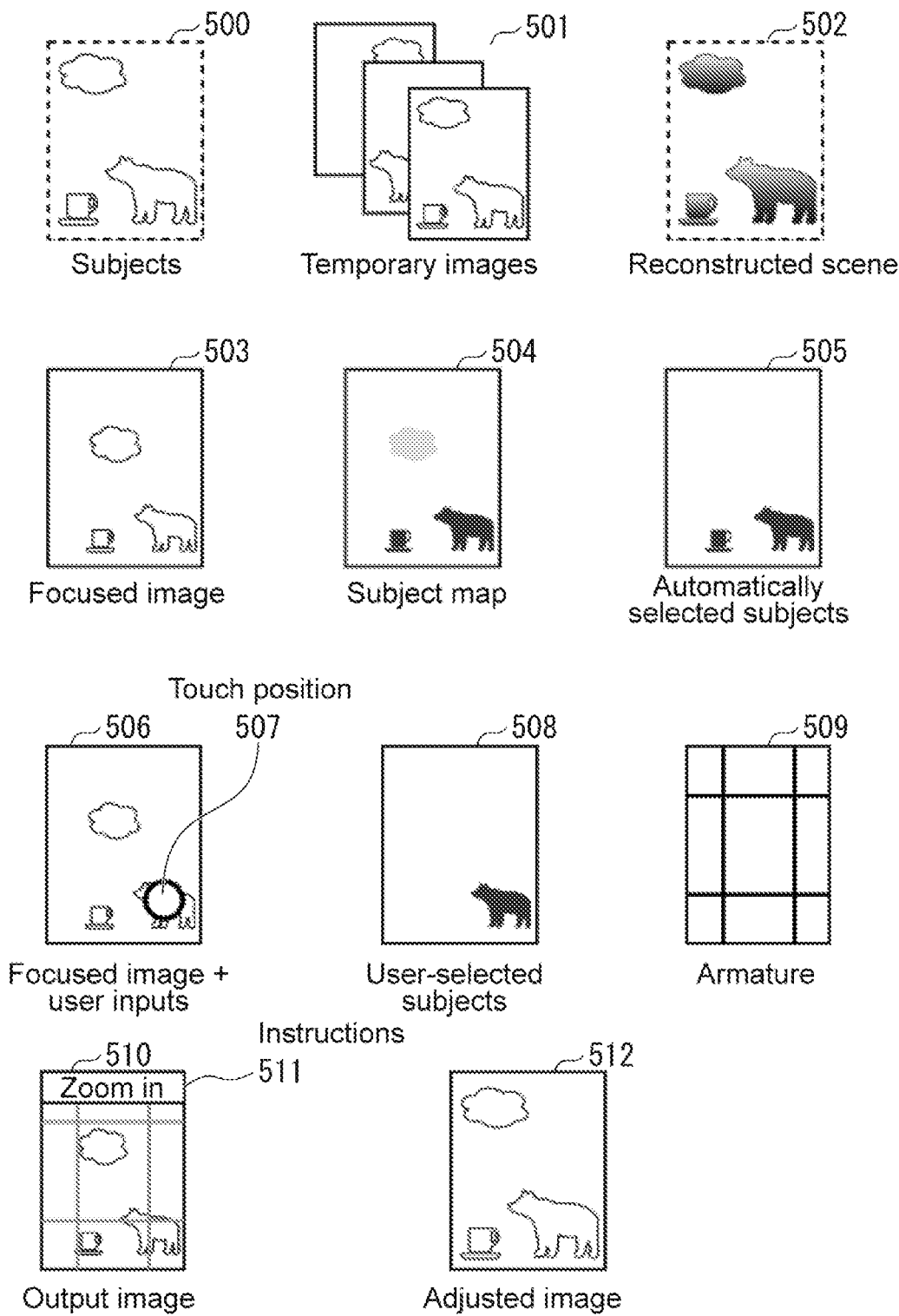
FIG. 5 shows examples of images to be processed in the steps of FIG. 4.

FIG. 4 illustrates an overall flowchart of the first embodiment, and FIG. 5 illustrates examples of images to be processed in the steps of FIG. 4.

At step 400, the user 103 is photographing subjects 500. The user 103 activates a camera function of the mobile system 100 and keeps the camera of the mobile system 100 facing toward surroundings of one or more subjects 104, for example, the user 103 moves the camera 102 around the subjects 104 or the user 103 moves with the camera 102 so that the camera 102 faces the subjects 104 from different directions, and the camera control unit 301 captures a plurality of temporary images 501 by using the camera 102. In the first embodiment, the temporary images 501 are temporary sequential pairs of color images and depth images, however, color images only, depth images only; or other type of images such as infrared images may be used as temporary images. The temporary images 501 are deleted when the user 103 ends the camera application through the user interface control unit 301.

At step 401, the scene reconstruction unit 302 extracts a reconstructed scene 502 from the temporary images 501. In the first embodiment, the reconstructed scene 502 may be a 3D mesh structure.

The 3D mesh reconstruction from the temporary images 501 may be implemented with well-known methods such as SfM (Structure-from-Motion), MVS (Multi-View Stereo) or KinectFusion. The scene reconstruction may be done with the CPU 200 or an additional hardware processor such as a GPU (Graphical Processor Unit) or any other hardware specified for matrix calculations such as convolution. The format of the reconstructed scene 502 is not limited to mesh. For example, other 3D geometry formats such as point clouds or implicit functions may be used as the reconstructed scene. Further, 2D data such as a set of color images or 2.5D data such as depth images may be used as the reconstructed scene.

At step 402, the camera control unit 301 detects a user operation related to taking a picture, for example, an operation that the camera 102 is directed in a certain direction for a predefined duration, an operation that the user performs a half-push operation on a shutter button, and so on, and the camera control unit 301 captures a focused image 503 from the camera 102. The focused image 503 is used to show armatures and instructions.

At step 403, the subject selection unit 303 generates a subject map 504 to specify a subject region (a region of a target subject) in the focused image 503. Details of the step 403 will be described later.

At step 404, the composition recommendation unit 304 generates an armature 508 and an instruction 510 as a recommendation for the focused image to improve composition quality of the subject region. Then the composition recommendation unit 304 shows an output image 509 on the touch display 101. Details of the step 404 will be described later.

At step 405, the composition adjustment unit 305 asks the user 103 to allow automatic composition adjustment or not. If the user accepts the automatic adjustment, the process proceeds to step 406. Otherwise, the automatic adjustment is canceled. The user 103 may then manually adjust the composition. The user 103 can follow the armatures and the instructions on the touch display 101, and move the camera 102 to manually generate an adjusted image 511.

At step 406, the composition adjustment unit 305 applies the automatic composition adjustment for the focused image to generate the adjusted image 511. Details of the step 406 will be described later.

Figure 6:
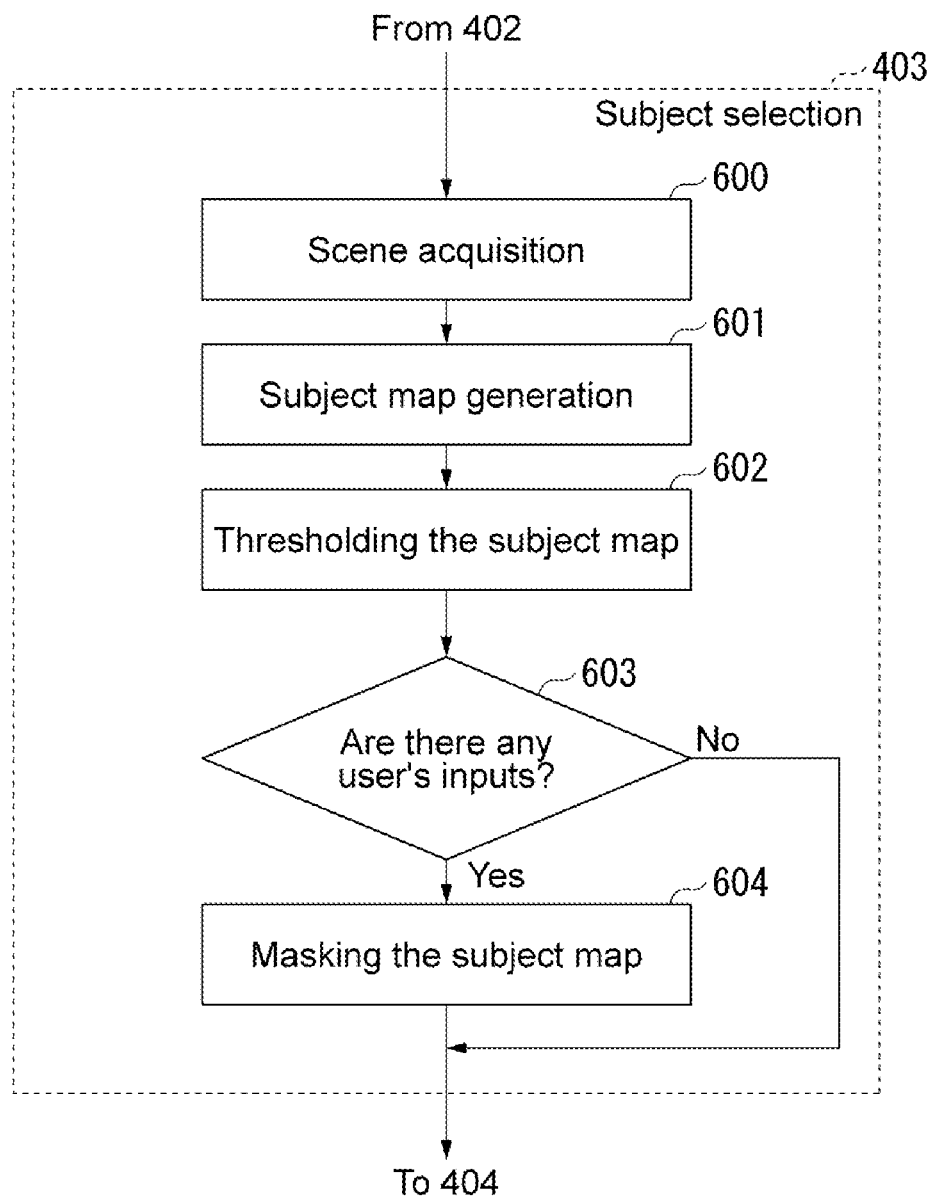
FIG. 6 shows a detailed flowchart of the subject selection at step 403.

Next, the subject selection at step 403 above is described in detail with reference to FIG. 5 and FIG. 6. FIG. 6 shows a detailed flowchart of the subject selection.

At step 600, the subject selection unit 303 obtains the reconstructed scene 502 extracted at step 401 from the scene reconstruction unit 302.

At step 601, the subject selection unit 303 generates a subject map 504 to specify a possible subject region in the space of the focused image 503 by using the reconstructed scene 502. In the first embodiment, the subject map 504 is a visual saliency map, however, other types of images may be used as a subject map, for examples, a semantic segmentation image, instance segmentation image and so on. Generation of the subject map may be implemented with well-known methods. For example, machine learning based methods such as convolutional neural network (CNN) or image-and-geometry processing based methods may be used. The subject map 504 may include subjects with low reliability which are not important. In order to improve accuracy of the subject map 504, it is important to add the reconstructed scene 502 as inputs for the estimation of the subject map 504. The subject map 504 generated only from color images may contain incorrect subject candidate areas if it's difficult to segmentize the images or to get the pixel intensity of the images. For example, that may be the case where pictures are taken when the scene is dark or crowded. When the format of scene information is geometry represented as a set of polygonal meshes, the subject selection unit 306 uses only the geometry in the three dimensional area which can be projected from the focused image 503.

At step 602, the subject selection unit 303 applies thresholding to the subject map 504 to remove subjects with low reliability, and keep automatically selected subjects 505 which do not reflect user preference.

At step 603, the subject selection unit 303 checks if there are any user inputs to specify user preferences for subjects in the focused image 503. The user inputs may be represented as touch positions 507 for the focused image 503. If there are any user inputs, the processing will go to step 604. Otherwise, the subject selection 402 finishes and goes to step 403.

At step 604, subject selection unit 303 converts the touch positions 507 to a mask for the automatically selected subjects 505. Then masking is applied to keep only subjects specified by the touch positions 507. Finally, user-selected subjects 508 are left in the subject map 504.

Figure 7:
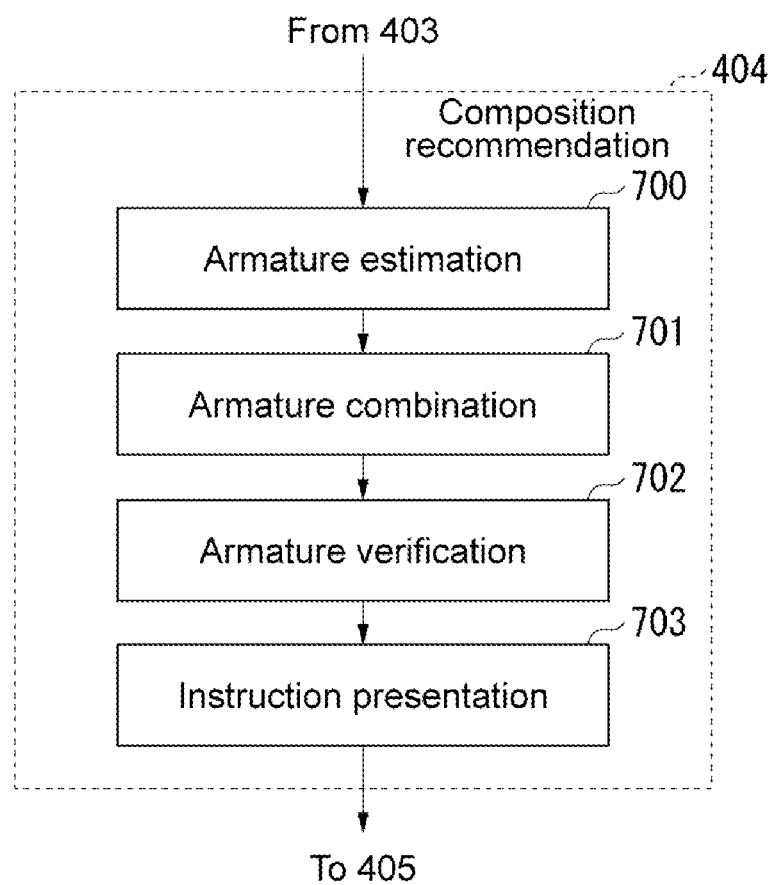
FIG. 7 shows a detailed flowchart of the composition recommendation at step 404.
Figure 8:
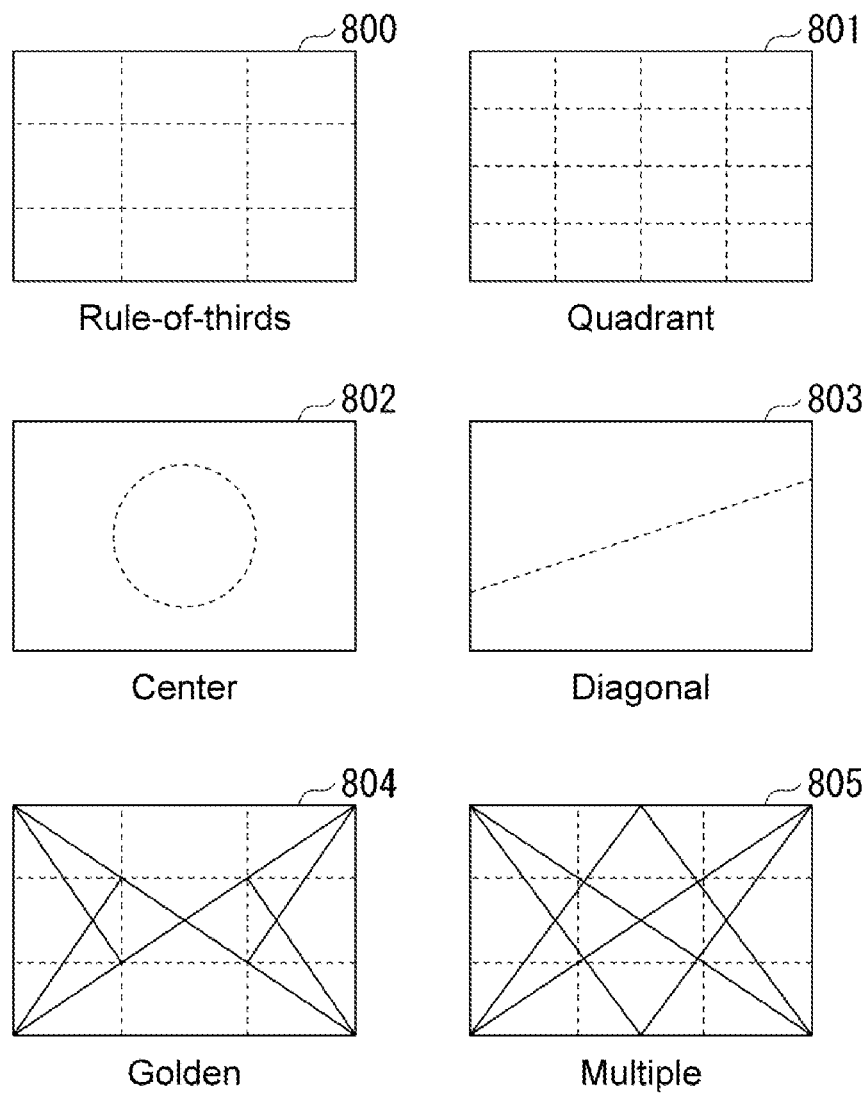
FIG. 8 shows examples of predefined armatures.
Figure 9:
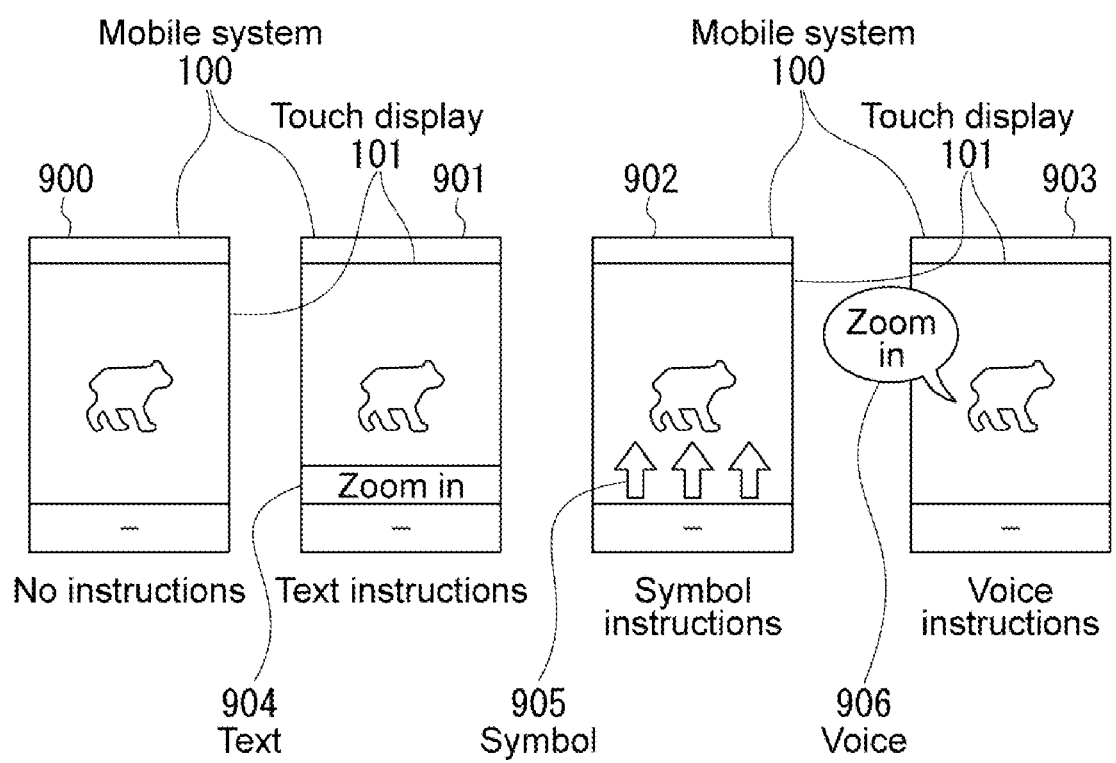
FIG. 9 shows examples of instructions for user operations.

The composition recommendation at step 404 above is described in detail with reference to FIG. 5, FIG. 7, FIG. 8 and FIG. 9. FIG. 7 shows a detailed flowchart of the composition recommendation at step 404. FIG. 8 illustrates examples of predefined armatures. FIG. 9 depicts examples of instructions for user operations.

At step 700, the composition recommendation unit 304 estimates an armature 509 from the user-selected subjects 508. For the estimation, the unit 304 extracts a feature vector from the selected subjects 508 with statistical heuristic methods or machine learning methods such as convolutional neural networks. The output of the estimation could be a probability vector that represents a likelihood of predefined armatures. Each predefined armature is composed of finite two-dimensional lines such as rule-of-thirds 800, quadrant 801, center 802, diagonal 803, golden 804, or multiple armatures combined 805. The storage unit 308 stores the predefined armatures encoded in vectorized formats, run length formats or other formats which can be easily decoded. The predefined armatures are loaded from the storage unit 306, and the output armature 509 will be generated according to the corresponding probability vectors with statistical methods such as maximum likelihood estimation or weighted summation.

At step 701, the composition recommendation unit 304 combines the armature 509 and the focused image 503 as the output image 510.

At step 702, the composition recommendation unit 304 verifies whether the current composition is good or not by evaluating the Euclidean distances between points in the area which has a size greater than a predefined threshold in the selected subjects 508, and the specified points, lines or intersections of the armature 509.

At step 703, according to the verification at step 702, the composition recommendation unit 304 presents instructions 511 for taking a good photo which can be operated through a GUI on the touch display 101 such as zooming, angle adjustment, focus correction, and other affine transformations. The instructions could be no instructions, text instructions 901 which show text message 904, symbol instructions 902 which show symbols 905 and voice instructions 903 which sound a voice 906. The user 103 can select whether to show the armature 509 and the instructions 511 or not through the touch display 101. If the current composition is good as a result of the verification at step 702, the composition recommendation unit 304 does not present instructions 511.

Figure 10:
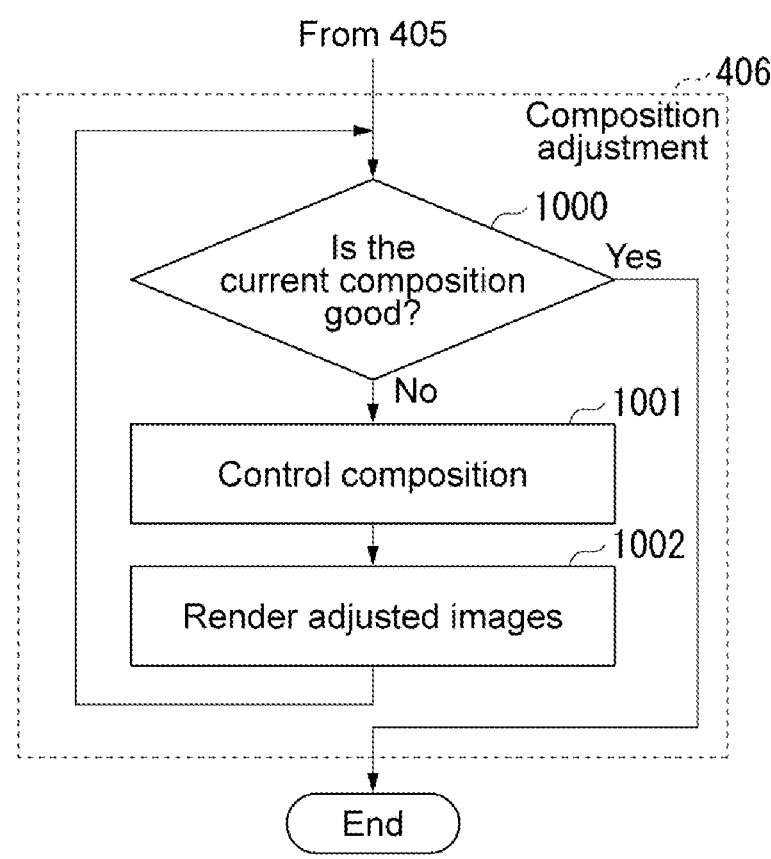
FIG. 10 shows a detailed flowchart of the composition adjustment at step 406.
Figure 11:
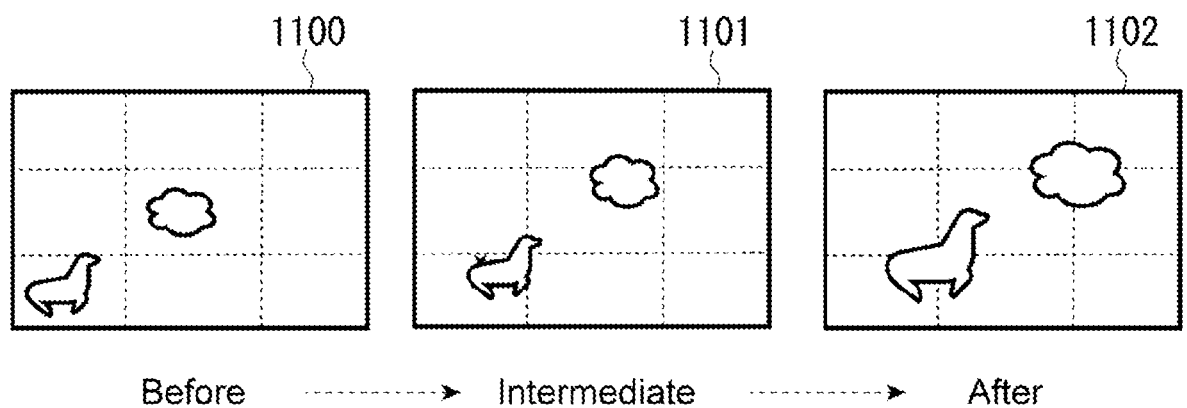
FIG. 11 shows examples of the composition adjustment.

Next, the composition adjustment at step 406 is described in detail with reference to FIG. 10 and FIG. 11. FIG. 10 shows a detailed flowchart of the composition adjustment at step 406. FIG. 11 illustrates examples of the composition adjustment.

At step 1000, the composition adjustment unit 305 verifies whether the current composition of the focused image 503 is good or not in the same way as step 702. If the current composition is good, step 1000 will be finished. Otherwise, the processing goes to step 1001.

At step 1001, the composition adjustment unit 305 improves composition quality automatically: At first, it is assumed that a focused image 1100 before the composition adjustment does not have good composition as a result of the verification at step 1000. Then, the composition adjustment unit 305 sends a signal to the camera control unit 301 to adjust the camera 102 according to the instructions 511 calculated by the composition recommendation unit 304 to improve the composition quality: The camera control unit 302 controls the camera 102 to make the composition better, whose operation includes zooming, angle adjustment, focus correction and white balancing. An intermediate focused image 1101 during the composition adjustment has better composition in terms of smaller Euclidean distances between points of subjects and specified points of armatures.

At step 1002, the composition adjustment unit 305 sends a signal to user interface control unit 300 to render the intermediate focused image 1101. Then, the processing goes back to step 1000. At this step 1002, the user 103 can confirm the intermediate focused image 1101. However, this step is not mandatory and could be skipped.

By iteration from step 1000 to step 1002, the focused image 1101 is updated repeatedly. The focused image 1102 after the iteration will have good composition.

According to the embodiments of the present invention, the users can take a good photograph without additional knowledge of composition, and given users' permission, the current composition selected by the user can be adjusted and a photo can be automatically taken.

To get scene information surrounding users, additional sensors such as GPS (Global Positioning System) or LiDAR (Light Detection and Ranging) can be used. Vision-based optimization methods, such as differentiable rendering, can be used to adjust the current composition.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A device for taking pictures, comprising:
a camera;
a display; and
a processor configured to capture a plurality of temporary images of one or more subjects by using the camera;
extract a reconstructed scene from the plurality of temporary images;
capture a focused image of subject matter for which a user intends to take a picture by using the camera;
generate a subject map in the focused image by using the reconstructed scene;
receive a selection of at least one of the one or more subjects from the subject map;
determine an appropriate armature from the at least one of the one or more subjects selected from the subject map;
combine the armature with the focused image;
determine that the composition of the focused image can be improved; and
present an instruction to the user to adjust the composition through an interface on the display.

2. The device according to claim 1, further comprising a speaker, wherein the processor is further configured to present the instruction to the user as an audible instruction through the speaker.

3. The device according to claim 1, wherein the processor is further configured to automatically adjust the composition in response to the user accepting automatic adjustment.

4. The device according to claim 1, wherein the temporary images are pairs of color images and depth images.

5. The device according to claim 4, wherein the reconstructed scene includes polygonal meshes or point clouds.

6. A method for taking pictures, comprising:
capturing a plurality of temporary images of one or more subjects by using a camera;
extracting a reconstructed scene from the plurality of temporary images;
capturing a focused image of subject matter for which a user intends to take a picture by using the camera;

generating a subject map in the focused image by using the reconstructed scene;
receiving a selection of at least one of the one or more subjects from the subject map;
determining an appropriate armature from the at least one of the one or more subjects selected from the subject map;
combining the armature with focused image;
determining that the composition of the focused image can be improved; and
presenting an instruction to the user to adjust the composition through an interface on a display.

7. A non-transitory storage media storing computer executable instructions thereon which, when executed by a processor, causes the processor to perform the method according to claim 6.

* * * * *